No. 856,005. PATENTED JUNE 4, 1907.
J. & W. H. WAMBSGANS.
VALVE.
APPLICATION FILED JAN. 18, 1906.
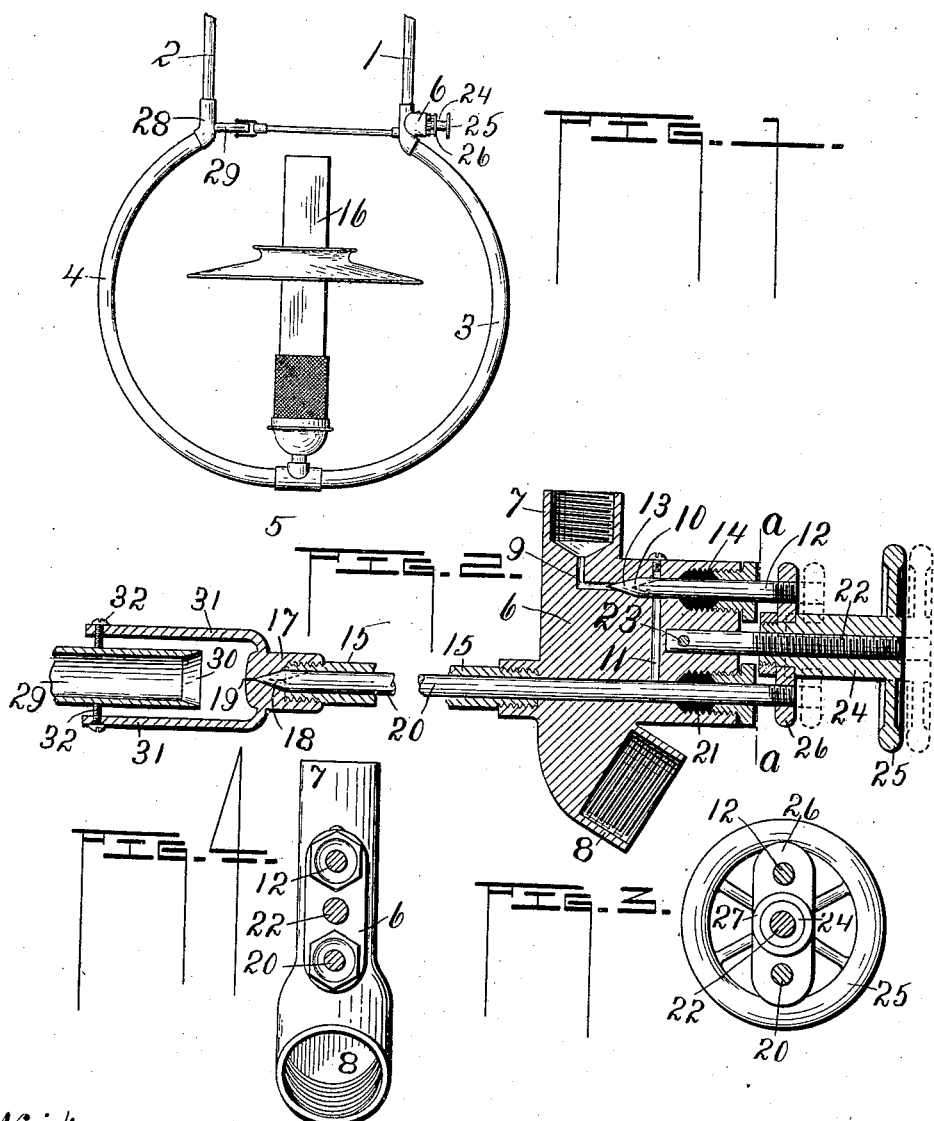
Witnesses:
E. W. Giles.
Mary E. Comegys
Inventors.
Jacob Wambsgans
William H. Wambsgans
by Wm. T. Tefft Atty.
THE NORRIS PETERS CO., WASHINGTON, D. C.

UNITED STATES PATENT OFFICE.

JACOB WAMBSGANS, OF PEORIA, AND WILLIAM H. WAMBSGANS, OF AURORA, ILLINOIS.

VALVE.

No. 856,005.  Specification of Letters Patent.  Patented June 4, 1907.

Application filed January 18, 1906. Serial No. 296,645.

*To all whom it may concern:*

Be it known that we, JACOB WAMBSGANS and WILLIAM H. WAMBSGANS, citizens of the United States, residing, respectively, at Peoria, in the county of Peoria and State of Illinois, and at Aurora, in the county of Kane and State of Illinois, have invented certain new and useful Improvements in Valves; and we do hereby declare that the following is a full, clear, and exact description of the invention, which will enable others skilled in the art to which it appertains to make and use the same.

This invention has reference more particularly to valves for hydro-carbon burners.

The object of our invention is to provide a simple, efficient and durable valve for controlling the flow of oil and the escape of gas in hydro-carbon burners for lighting, heating and for other purposes.

Referring to the accompanying drawings, which are made a part hereof and in which similar reference characters indicate similar parts, Figure 1 shows our improved valve applied to a hydro-carbon lamp; Fig. 2 a vertical longitudinal sectional view of the valve, a portion being broken away to allow an enlarged view to be shown. Figs. 3 and 4 vertical cross sectional views of the valve looking toward the right and left respectively of the line *a—a* of Fig. 2.

In hydro-carbon burners, the gas is usually made of vaporized oil suitably mixed with air to form a combustible mixture and it is customary to use a rather volatile oil such as gasolene, and vaporize the same by subjecting it to heat from the burner. Inasmuch as it is difficult to absolutely control volatile oils, the valve or valves for controlling the flow of the oil and the escape of the gas to the burner, which are usually located near the heated area so that the oil is vaporized directly after passing through the valve controlling the supply of the same, must be very nicely made and adjusted. It has been customary to employ valves having a threaded stem for moving the valve to and from the valve seat. Valves of this character, however, possess the disadvantage that the turning or spiral movement whereby the valve is operated grinds the valve against the valve seat and soon wears the bearing surfaces thereof so that the valve does not effectually control the flow of the oil. Furthermore, as the valve parts gradually wear, it requires a greater turn of the valve stem to close the valve and consequently the position of the valve on the valve seat, when the valve is closed, is constantly changing and nice adjustment of the valve and valve seat, which is necessary in this kind of valve, is rendered impossible.

To obviate the foregoing disadvantages, there is provided in this invention together with other novel features, means for operating the valves directly to and from the valve seats without the customary turning or spiral movement.

The hydro-carbon lamp herein shown, in connection with which my invention is described, but to which it is not necessarily limited, is of the usual construction, being provided with the customary hanger arms 1 and 2 and the semicircular oppositely disposed brackets 3 and 4 which are united at their lower ends by the coupling 5 which supports the burner of the lamp. The bracket 3 is connected to the hanger 1 by means of the valve casting 6, the said casting being provided with portions 7 and 8 which are threaded internally to receive the threaded ends of the hanger arm 1 and the bracket 3 respectively. The hanger arm 1 is a hollow tube and communicates with the oil supply of the lamp, thus providing a channel for the oil down to the casting 6. In the casting 6 and leading from the point of entrance of the tubular hanger arm 1 with said casting is a passageway or channel 9 which communicates through the valve 10 with another passageway 11. The said valve 10 which controls the flow of oil from the tubular hanger arm 1 is cone shaped as shown and is adapted to be operated by the valve stem 12 to and from the valve seat 13, which is a conical enlargement of the passageway 9. The valve stem 12 extends at right angles to the hanger arm 1 through a suitable stuffing box 14 and protrudes a short distance beyond the casting.

Near the lower part of the valve casting is provided a tubular extension or generator tube 15, which extends over and beyond the chimney 16 of the burner of the lamp so as to be heated by the hot gases escaping therefrom and terminates in a tip 17 which has a threaded connection with the outer end of said tubular extension. This tip has a capillary opening therein controlled by the conical valve 18, the said valve being provided with a needle point 19 adapted to be contained in the said capillary opening when the valve is closed to prevent clogging of said opening. This said valve 18 is operated by the valve stem 20, which extends parallel to the valve stem 12 as is shown in the drawing, through the tubular extension or generator tube 15, the opening in the lower part of the casting 6 and the stuffing box 21, which corresponds to the stuffing box 14, and protrudes beyond the casting 6 similarly to the valve stem 12.

Centrally disposed between the protruding ends of the valve stems 12 and 20 is a stem or pin 22 suitably secured to the casting 6, by means of the pin 23, upon the threaded portion of which is provided a sleeve 24 having a hand wheel 25 whereby said sleeve is turned on its threaded connection with the stem or pin 22 to and from the casting 6. Near the opposite end of the sleeve 24 between the hand wheel 25 thereof and the valve casting 6 is an elongated disk or plate 26, which is loosely secured on said sleeve by means of the threaded ring or thimble 27. To this said plate are secured, one on each side of the sleeve 24 the protruding ends of the valve stems 12 and 20 so that when the hand wheel 25 is turned the valve stems 12 and 20 are moved correspondingly and simultaneously by the said disk, thus moving the valves 10 and 18 directly to and from the valve seats without the usual turning or spiral movement hereinbefore mentioned.

The passageway 11 which communicates with the oil inlet 9 when the valve 10 is open, communicates with the opening in the lower part of the casting 6, through which the valve stem 20 extends, said opening, together with the opening in the tube or generator 15 being sufficiently large to permit the flow of gasolene around the valve stem 20 from the passageway 11 to the tip 17 of the generator.

From the foregoing, it is apparent that when the parts are moved approximately to the position shown in dotted lines, the valves 10 and 18 are open, and the oil passes from the oil supply through the hanger 1, the passageway 9 of the casting 6, the valve 10 and the passageway 11 into the chamber around the valve stem 20. The tube or generator 15 being exposed to heat, the oil is vaporized as it passes therethrough, and issues through the capillary opening in the tip 17 in a jet.

Extending from the coupling 28 which connects the hanger arm 2 with the bracket 4 is a short tube 29, the open end or mouth 30 of which is suitably positioned a short distance from the tip 17 so that the gas as it issues from the opening in said tip is driven into the mouth of the tube 29, drawing in with it as it enters said tube, a sufficient amount of air to form a combustible mixture, as is well known in the art. To provide for accurately adjusting the opening in the tip 17 directly in front of the mouth 30 of the tube 29 there are provided brackets 31 which are adjustable by means of the set screws 32.

While I have for the purpose of illustration, shown my invention in connection with a certain form of hydro-carbon lamp, I contemplate its use in connection with any hydro-carbon burners for lighting, heating or other purposes.

What I claim is;

1. In a device of the class described, the combination of a single integral part provided with two valve openings therein, a tubular retort extending from one of said openings and provided with a capillary outlet at the end thereof, a needle valve extending through the last mentioned opening in the single integral part into the retort for controlling the outlet therefrom, an inlet to the other opening in the single integral part controlled by a valve in said opening, a passageway connecting both of said valve openings in the single integral part, a stationary threaded pin on the single integral part intermediate of the valve openings therein projecting outwardly from said part, a manually operable member screwed on said pin and supported thereby, a non-rotary disk on said manually operable member connected with portions of the valve stems protruding from the aforesaid single integral part, for simultaneously imparting a direct in and out movement to both of said valves by the spiral movement of said manually operable member.

2. A valve embodying a body formed with two parallel passages arranged in side by side relation and of unequal length, the longer of said passages extending through opposite ends of said body and the shorter through but one of said ends, said body having a channel communicating with the inner end of said shorter passage and further having a second vertical channel intermediate the length of each of said passages and connecting the latter, a valve in each of said passages, a valve seat formed at the juncture of the shorter passage and said first named channel and means for operating said valves in unison.

3. In a device of the class described, a valve casing a pair of valves operable in the casing and provided with stems which project without the casing, a threaded pin disposed between said valve stems and having its inner end projecting in and rigidly secured to the casing, a sleeve threaded on said threaded portion of said pin and having a hand wheel on its outer end, the forward end of said sleeve having a reduced threaded portion forming a shoulder, a plate loosely received over said reduced portion and abutting against said shoulder, and a threaded ring secured over said threaded portion of the sleeve and abutting against said plate, the outer ends of each of the valve stems being threaded and projecting in threaded openings provided therefor in said plate.

4. A valve comprising a casing having two parallel valves each having a stem slidably supported in bores provided therefor in said casing and each having one end of its stem projecting beyond the casing, a member rigidly secured at one end to said casing, and at its opposite end extending beyond said ends of the valve stems and being threaded, a sleeve on the threaded part of said member, said sleeve being wholly disposed within the casing and having its inner end spaced from the exterior of the casing when the valves are in closed position, and means supported from the sleeve and located exterior of the casing for actuating said valve stems in unison.

In testimony whereof we have affixed our signatures, each in the presence of two witnesses.

JACOB WAMBSGANS.
WILLIAM H. WAMBSGANS.

Witnesses to the signature of Jacob Wambsgans:

RUDOLPH JUNGST,
E. M. GILES.

Witnesses to the signature of William H. Wambsgans:

ADAM SCHOEBERTEIN,
JOHN REISING, Jr.